(No Model.)

W. LENDEROTH.
BRICK.

No. 508,428.          Patented Nov. 14, 1893.

WITNESSES:
Gustave Dieterich.
Charles E. Smith.

INVENTOR:
William Lenderoth,
BY Briesen & Knauth
his ATTORNEYS.

THE NATIONAL LITHOGRAPHING COMPANY,
WASHINGTON, D. C.

UNITED STATES PATENT OFFICE.

WILLIAM LENDEROTH, OF STAPLETON, NEW YORK.

BRICK.

SPECIFICATION forming part of Letters Patent No. 508,428, dated November 14, 1893.

Application filed October 6, 1892. Serial No. 448,012. (No model.)

*To all whom it may concern:*

Be it known that I, WILLIAM LENDEROTH, a subject of the Emperor of Germany, residing at Stapleton, Richmond county, New York, have invented an Impovement in Bricks, of which the following is a specification, reference being had to the accompanying drawings, in which—

Figure 1:
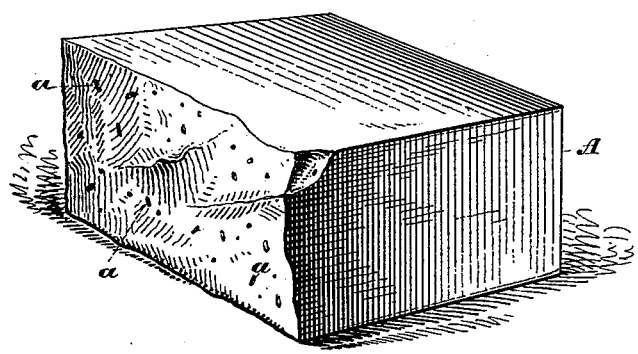
Figure 2:
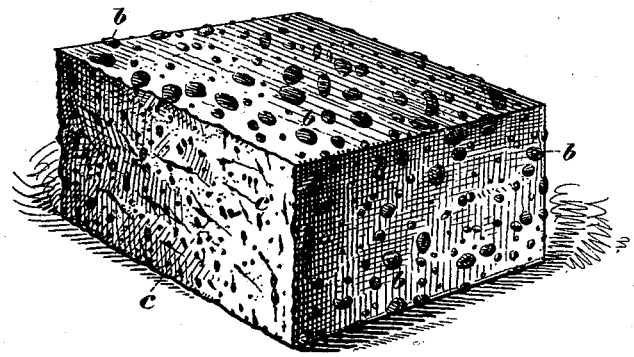
Figure 3:
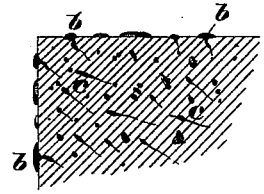

Figure 1 represents a section through a brick prepared according to my invention, before being burned; Figs. 2 and 3 are similar sections of the same after being burned.

This invention relates to new spotted or mottled bricks, having for its object to utilize a substance which will within the body of the brick form connecting veins between the particles of clay, while on the outer face the matter added will produce protuberances or projecting spots.

The invention mainly consists in combining with the ordinary clay or brick-mixture a shale or shale-like substance of a composition hereinafter described which in a powdered form is admixed with the clay, and thoroughly embedded in the brick as pressed, but when the brick is burned the fusible matter of the substance employed will be melted and will within the body of the brick form veins, while on the outer side the melted drops will form protuberating spots or projections.

The shale I employ is what is known and described as "triassic red shale" and is found in the palisade region extending along the coast of the Atlantic Ocean. This red shale differs very materially in its structure from all other shales, and has never hitherto been used in the manufacture of brick and analogous articles.

An analysis of this shale-like substance which I use shows the following ingredients and their proportions, viz: silica, from forty-five to fifty per cent.; alumina, from fifteen to twenty per cent.; iron oxide, from ten to sixteen per cent.; lime, from three to six per cent.

In the accompanying drawings, referring to Fig. 1, it will be seen that the brick A is composed mainly of clay or other analogous brick-mixture, within which are embedded particles *a a* of the described shale or shale-like substance. The proportion of admixture which I have found convenient is nine per cent. by measure of the shale-like substance to the other matter in the brick; but this proportion may be varied, according as one desires the spots to be more or less numerous. When a brick thus compounded is subjected to the proper degree of heat the fusible portion of the shale-like substance (which will melt easily) will be melted within and on the brick which does not melt, and those particles which are within the brick will permeate the mass of clay and form veins *c* as indicated in the sectional portion of Fig. 2. But those particles of shale-like substance which are on the outer surface of the brick will, under the influence of heat, form drops, and these drops when the brick is afterward chilled will be congealed into semi-spherical or other shaped protuberances *b*, which spots on the outer side of the brick will give it a peculiar decorative effect, and being protuberances, will serve to produce the decoration without causing air-holes.

Heretofore sundry substances have been added to clay in brick making for the purpose of producing the spots or spotted effect, but the difficulty with these admixtures has been that in the act of burning, these admixtures served to produce air-holes in the surface of the brick and thereby rendered the final product objectionable. In my improved brick there is no occasion for the formation of any air-holes—certainly none will be formed by the admixture of the shale-like substance.

If the effect desired is only to be a surface effect, my invention will apply also if the shale-like substance is simply sprinkled over or pressed into the surface of the brick before it is burned. This treatment will be found sufficient to produce, when the brick is burned protuberating congealed spots and also a slight veining extending for a short distance into the mass of the brick.

By brick in this specification I mean any clay article of any shape.

What I claim, and desire to secure by Letters Patent, is—

A brick or block, the main body being of clay, traversed by veins of triassic red shale and having on its surface protuberances formed of triassic red shale, substantially as and for the purposes specified.

WILLIAM LENDEROTH.

Witnesses:
HARRY M. TURK,
CHARLES E. SMITH.